Patented Oct. 11, 1938

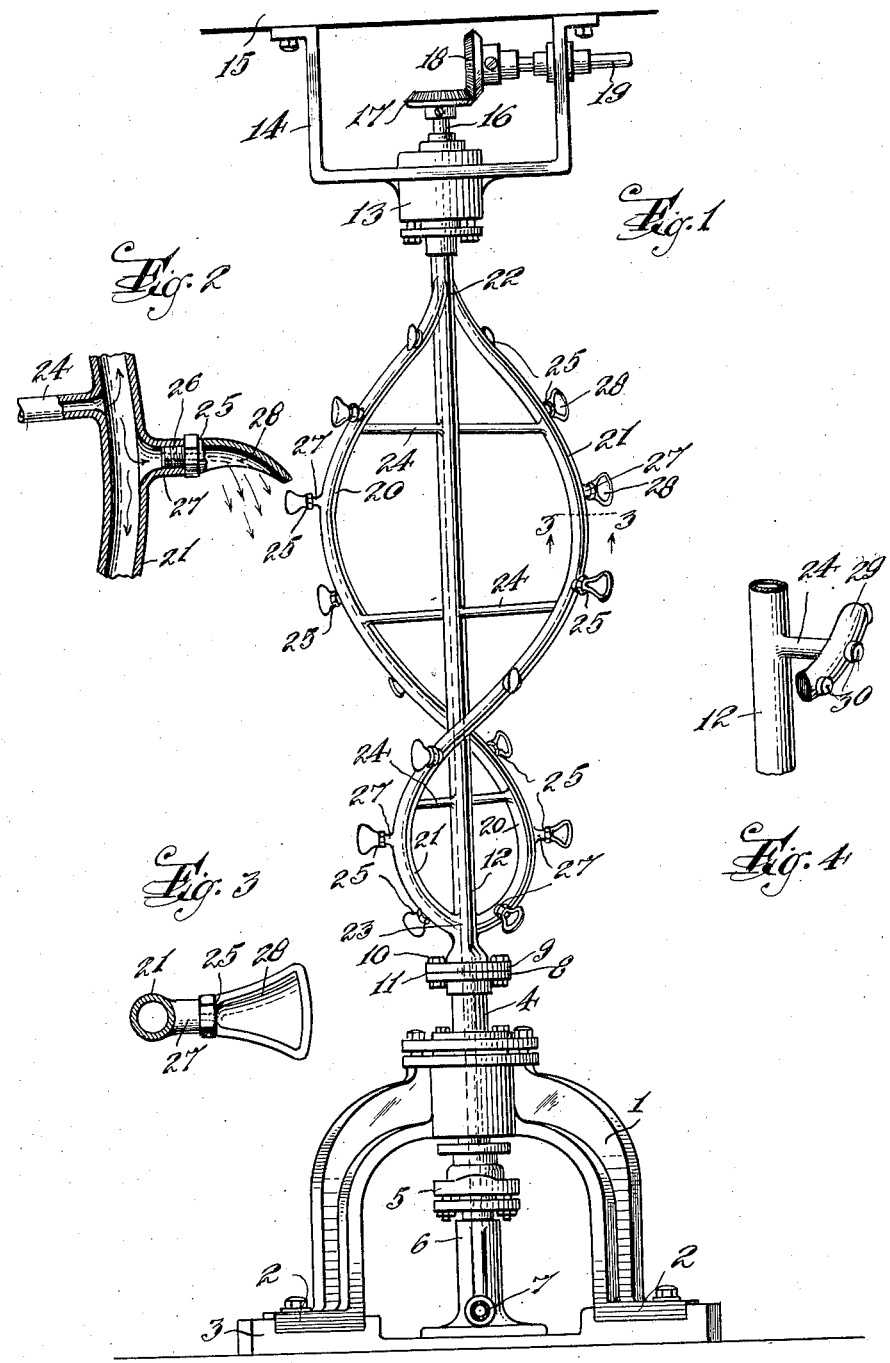

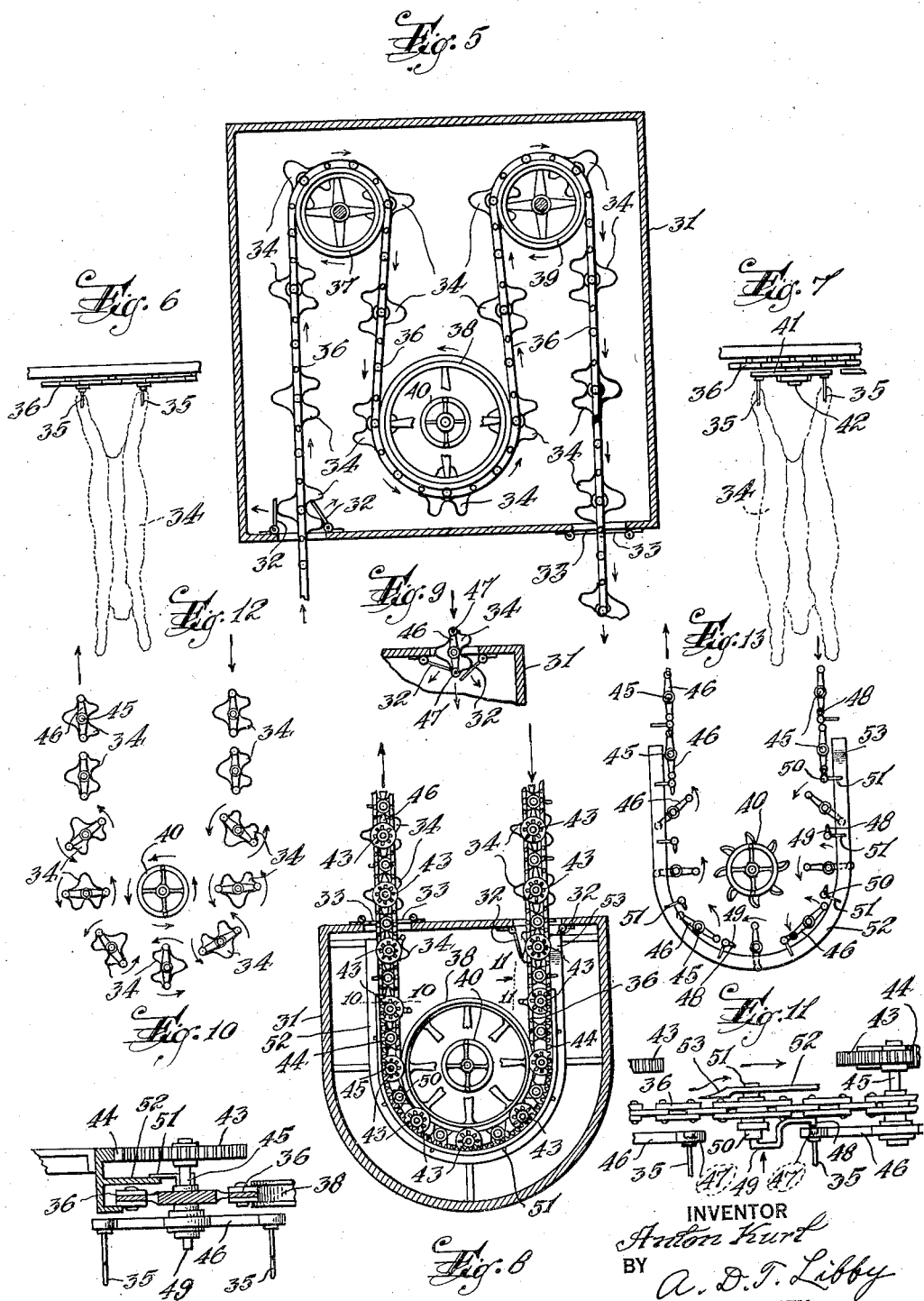

2,132,634

UNITED STATES PATENT OFFICE 2,132,634

APPARATUS FOR AND METHOD OF CLEANING CARCASSES

Anton Kurt, Jersey City, N. J.

Application March 31, 1937, Serial No. 134,047

16 Claims. (Cl. 17—1)

This invention relates to a method of cleaning animal carcasses in slaughter houses, and apparatus for carrying out the method.

At the present time, it is the practice in slaughter houses to have operators stationed at different points in the slaughtering process, each to direct a hose or stream of water against different parts of the carcass. The trouble with this procedure is that two different operators may direct their washing or cleaning operations on the same part of the carcass, and there is no assurance that the various streams will be effectively directed over both the inside and outside of the carcass. In addition, the present method of washing the carcasses is very wasteful of water.

It is therefore the principal object of my invention to provide a new method of washing which is done by the apparatus to be hereinafter described, by which method the entire surface, inside and out, of the carcass will be effectively washed with a great saving in water or cleaning fluid.

Another object of my invention is to provide what in effect is an automatic washing or cleaning process.

These and other objects will be apparent to one familiar with the present slaughtering house processes, from a reading of the specification, taken in connection with the annexed drawings, wherein:

Figure 1 is an elevational view of my preferred form of cleaning apparatus per se.

Figure 2 is a sectional view through one of the fluid exits.

Figure 3 is a view on the line 3—3 of Figure 1.

Figure 4 is a fragmentary view of a modified form of fluid exit means.

Figure 5 is a plan view of one arrangement for carrying my method into operation.

Figure 6 is a view of a portion of the conveyor, showing the position which a carcass would have thereon.

Figure 7 is a view similar to Figure 6, but of a modified form of conveyor.

Figure 8 is a view similar to Figure 5, but showing a modified form of closure and conveyor.

Figure 9 shows a detail of the entrance or exit into the closure of Figure 8.

Figure 10 is a view approximately on the line 10—10 of Figure 8.

Figure 11 is a view approximately on the line 11—11 of Figure 8.

Figure 12 is a diagrammatic illustration of the movement of the carcass through the closure.

Figure 13 is a view similar to Figure 12, but illustrating how the members carrying the carcass may be unlocked or locked in position as they enter or leave the closure.

Referring now to the details wherein like numbers refer to corresponding parts in the various views, 1 is a support which may take any desired form, that of a tripod being shown, having its feet or flanges 2 adapted to be fastened directly to the floor or to a floor plate 3. Extending upwardly from the bearing support 1, is a hollow shaft member 4, the lower end of which is connected through a stuffing box 5 to a fitting 6 having a pipe opening 7 to receive a supply line bringing the cleaning fluid thereto. The shaft 4 may terminate in a flange 8 adapted to be fastened to a flange 9 by a plurality of bolts 10, a gasket 11 being used between the two flanges.

The flange 9 is fastened, as by welding, to a hollow shaft or member 12 which extends upwardly and has a suitable bearing support 13 carried in any satisfactory manner as by a bracket 14 fastened to any suitable member 15. The end 16 of the member 12 is adapted to receive any suitable member thereon for the purpose of rotating the shaft 12. As illustrated, a gear 17, meshing with a gear 18, may be used and power applied to the shaft 19 carrying the gear 18. In some cases the motor may be connected directly to the shaft end 16 as I have done in practice, but, as indicated, the driving means may be any satisfactory source of power and connected to the shaft end 16 in any satisfactory manner.

Connected to the hollow shaft member 12, intermediate its bearing supports, are a plurality, two being shown, of tubular members 20 and 21 which are preferably sinuously and curvilinearly formed, something as shown in Figure 1. Preferably, the tubular members 20 and 21 are of the same length and connected at their opposite ends 22 and 23 at about the same longitudinal places on the shaft 12 in order that the rotating unit comprising the hollow shaft 12 and the tubular members 20 and 21 may be balanced. Extending from the member 12 to the tubular members 20 and 21 are a plurality of hollow braces 24 which open at one end into the hollow part of the shaft 12, and at their other ends into their respective tubular members 20 and 21, so that the cleaning fluid coming up through the shafts 4 and 12 may pass transversely from the member 12 into the tubular members 20 and 21 at different places along its length.

As shown in Figure 1, the members 20 and 21 are arcuately spaced around the shaft 12, and the top half or portions are more widely separated than the lower portions for a purpose which will be hereinafter set forth. Distributed along the length and on the extreme surfaces of the tubular members 20 and 21 are a series of exits 25 which may be in the form of nipples having pipe thread ends 26 to engage the threaded holes in the protuberances 27 formed integral with the members 20 and 21. The outer ends of the exit members or nipples 25 are spread out somewhat fan-shaped and have inner curved surfaces 28 which act to fan out the cleaning fluid into a sheet or fan-like stream. The number of the nipples used may be varied, but I prefer to arrange them in such a manner that the edges of the streams or sheets of cleaning fluid will just about meet at the point where they will hit the carcass.

It will be seen from Figure 1 that the nipples are arranged at different heights of the apparatus and at different angles so that as the unit structure, comprising the shaft 12 and tubular members 20 and 21 with their immediately associated parts, is rotated, these streams or sheets of cleaning fluid will strike the carcasses at all angles, from one end of the carcass to the other, and because of the wider spread of the members 20 and 21 toward the top of the structure, these parts are brought closer to a carcass on the conveyor than the lower part. This applies a larger amount of cleaning fluid to the top of the carcass, and because of the fact that the cleaning fluid, such as water, runs down over the carcass, not so much is needed to be sprayed or forced on the carcass from the lower portion of the apparatus.

Instead of the tubular members 20 and 21, I may, as shown in Figure 4, equip the hollow shaft 12 and the braces or feed members 24 with relatively short curvilinearly formed members 29, each having a plurality of exits or jets 30. In this construction there will preferably be more of the feed arm braces 24 used than in the construction shown in Figure 1, but the general effect is somewhat the same.

In applying my apparatus, I may use an arrangement such as shown in Figure 5, in which the closure 31 has automatic swinging doors 32 and 33 which are operated by the carcasses 34 carried by hooks 35 on an endless chain or conveyor 36. As the conveyor moves forward in the direction of the arrows in Figure 5, a carcass 34 hits the doors 32 and pushes them open, and the carcass is then carried by the conveyor around the drive wheels 37, 38 and 39 and out the other door 33. Immediately the carcasses come into the closure 31 and as long as they are therein, the apparatus of Figure 1, shown generally by the numeral 40 in Figure 5, sprays the carcasses on all sides and in every direction, as it will be seen that in the movement of the carcasses through the closure, different sides of the carcasses are presented to the cleaning apparatus 40, as it is to be understood that the cleaning fluid has considerable pressure and comes out of the nozzles 25 or the jets 30 with considerable force which will carry to all parts of the closure, thereby enabling several carcasses to be simultaneously washed or cleaned.

If desired, a pair of the hooks 35, carrying a carcass 34, may be carried on a plate 41, as shown in Figure 7, supported on the conveyor 36 as by a stud 42, on which the plate 41 may rotate so that as the carcass is passed through the closure the force of the cleaning fluid striking it may, of itself, turn the carcass.

In Figures 8 to 13 inclusive, I have shown a more or less automatic arrangement in which the conveyor 36 carries a plurality of gear wheels 43 adapted to operate in a track 44. Each gear wheel 43, there being one for each pair of hooks 35, is fastened to and adapted to rotate a shaft 45, on one end of which is carried a plate 46 similar to the plate 41 of Figure 7. One end of the plate or yoke member 46 has a recess 47 therein to receive a finger or lug 48 carried on the end of an arm 49 which in turn is carried by a stub shaft 50, the opposite end of which carries an arm 51 that is adapted to contact with a frame member 52.

By reference to Figure 13, it will be seen that as the conveyor travels in the direction of the arrow, one of the members 51, associated with one of the plates 46, strikes the cam face 53 and moves up to the position shown in Figure 11, thereby lifting the shaft 50 and the arm 49 out of their locking engagement in the recess 47 of the plate 46, thereby leaving the plate 46 free to be rotated by the gear 43 and track 44, somewhat as indicated in Figures 13 and 12 which illustrate the carcasses 34 being turned to various angular positions as the conveyor passes through the closure 31.

As indicated in Figure 8, the gears 43 will make several revolutions in traveling around the large driving gear 38, but in order to more clearly illustrate the idea schematically Figures 12 and 13 have been made to indicate only one rotation of the carcass as it goes through the closure 31. It will be seen by reference to Figures 8 and 13, and from what has been said that the plate 46, carrying a pair of hooks 35 and a carcass 34, is unlocked before the gears 43 come into engagement with the track 44, and that these plates are again locked into position directly after the gears leave the track; or they may be locked in position before the gears leave the track.

By using an arrangement such as shown in Figure 8, wherein the carcasses are rotated, one or more times in close proximity to the cleaning apparatus 40, this apparatus may be made so that the jets or streams of cleaning fluid may be directed at various angles on the carcasses without actually rotating the shaft 12, but by rotating it as shown in Figure 1 and using a standard form of conveyor as shown in Figure 5, the apparatus can be made much simpler.

However, in certain cases where a dehairing operation is desired, such as when hogs are being slaughtered, I may feed through the pipe 12 a fluid at a desired temperature and pressure which will take the hair directly off the carcasses. For example, water at a desired temperature and pressure, and containing some material such as resin, may be used for this dehairing operation, so that in this specification where I refer to cleaning the carcasses, the term should be considered broad enough to cover the ordinary washing with water, or cleaning with a dehairing fluid, whether it be only hot water at a desired temperature or water containing some ingredient which acts to assist the dehairing operation. As a matter of fact, I have found that if the hair is first treated with some substance which will stiffen or mat the hair, such as plaster of Paris, when the sheets of water from the nozzles 25 strike this with sufficient pressure and temperature, the hair is cleanly removed from the carcass.

The revoluble unit including the curved pipes 20 and 21 and flange 9 may be readily replaced by another unit having larger or smaller pipes with a more or less number of spray nipples 25, to better supply the desired amount of water according to the size of the carcasses to be washed or treated.

From what has been said it will be readily understood that the details of the apparatus for carrying my method of cleaning carcasses into practice may be varied over considerable range, without departing from the spirit of my invention or the scope of the appended claims.

What I claim is:

1. An apparatus for the purpose described including a hollow member supported for rotation at opposite ends with means for rotating said member, arms extending radially outward from said member, the arms also being hollow and the hollow portions thereof opening into the interior of said hollow member, said arms carrying liquid distributing means having internal connections with the interior of said arms, and means for passing a liquid under pressure into said hollow member.

2. An apparatus as defined in claim 1 further characterized in that the liquid distributing means comprises a plurality of tubular members sinuously and curvilinearly arranged around said hollow member and having outwardly directed fluid outlet means.

3. An apparatus as defined in claim 1 further characterized in that the liquid distributing means comprises a plurality of tubular members sinuously and curvilinearly arranged around said hollow member, and fan like spray nozzles arranged along the length of said tubular member on the surfaces thereof outermost from said hollow member and having openings into the interior of said tubular members.

4. An apparatus as defined in claim 1 further characterized in that the liquid distributing means comprises a plurality of tubular members sinuously and curvilinearly arranged around said hollow member and having their extremities turned inwardly and fastened to said hollow member and opening thereinto and outwardly directing fluid outlet means carried on said tubular members.

5. An apparatus for the purpose described, including a vertically arranged hollow member having supports at both ends whereby said member may be rotated, a plurality of arcuately spaced tubular members anchored at both ends to said hollow member and opening thereinto, said tubular members being sinuously and curvilinearly arranged along the length of the hollow member intermediate its supports, braces for said tubular members intermediate their ends, outwardly directed liquid exit means distributed along the length of the tubular members and means for passing a liquid into said hollow member.

6. An apparatus as defined in claim 5 further characterized in that at least some of said braces are hollow and open at one end into said hollow member and at the other end into their cooperative tubular member.

7. An apparatus as defined in claim 5 further characterized in that the liquid exit means comprises fan shaped nozzles arranged so the several sheets of water from the fan surfaces of the nozzles will meet to substantially form a continuous curved revolving sheet of liquid.

8. Apparatus for the purpose described including a vertically mounted revoluble unit with means for rotating the unit, said unit having a hollow axial member with arcuately spaced sinuously and curvilinearly arranged tubular members passing across and at least partly around but attached to said axial member at longitudinally spaced points and connected to said member so as to continuously and freely receive fluid therefrom when fluid is in the axial member, said tubular members having outwardly directed liquid exits and means for passing fluid under pressure into said axial member.

9. Apparatus for the purpose described including a vertically mounted revoluble unit with means for rotating the unit, said unit having a hollow axial member with pipe taps extending radially therefrom at spaced points along the length of said axial member and curvilinearly formed members carried by said pipe taps and curving sinuously substantially in a direction from one end to the other end of the revoluble unit and having outwardly directed liquid exits and means for passing fluid under pressure into said axial member.

10. Apparatus for the purpose described including a closure, a conveyor passing through the closure and adapted to carry suspended carcasses therethrough, a revoluble unit within the closure comprising a hollow axial member carrying a plurality of curvilinearly formed tubular members along its length and having connection with the hollow portion of said axial member and having outwardly directed fluid exits, means for revolving said unit and means for passing fluid under pressure into said axial member, said unit being located with respect to said conveyor portion within the closure, so that the fluid is passed over all of the exposed exterior and interior parts of the carcasses as they move through the closure.

11. Apparatus as set forth in claim 10 further characterized in that the conveyor is provided with revoluble parts whereby the carcasses are revolved on the conveyor as they pass through the closure.

12. Apparatus as set forth in claim 10 wherein the tubular members cross the axial member and said revoluble unit has a larger number of exits in the upper portion of the curvilinear members taken from the point where these curvilinear members cross the axis of the axial member, than the lower portion of said curvilinear members taken from the same point, whereby the said upper positioned exits discharge a greater volume of fluid from the upper curvilinear portions than from the lower curvilinear portions.

13. Apparatus as set forth in claim 10 further characterized in that said revoluble unit has the tubular members arranged so the upper half of said member is nearer to the carcasses than the lower half for the purposes described.

14. The method of cleaning animal carcasses which consists in directing numerous rotating streams of liquid toward a suspended carcass and simultaneously causing the streams to move in different planes and at various angles relative to each other.

15. The method of cleaning animal carcasses which consists in rotating suspended carcasses while at the same time directing against them rotating streams of cleaning fluid and simultaneously causing the streams to move in different planes and at various angles relative to each other.

16. The method of cleaning animal carcasses which consists in passing the suspended carcasses through a closure and while within the closure simultaneously directing over the full length of carcasses numerous streams of cleaning fluid, while causing the streams to rotate and to hit the carcasses in different planes and at various angles relative to each other.

ANTON KURT.